F. R. WILLSON.
ANTISKID DEVICE.
APPLICATION FILED FEB. 11, 1918.

1,299,082.

Patented Apr. 1, 1919.
2 SHEETS—SHEET 1.

Witness
A. Sundell

Inventor
Freeman R. Willson

By
C. C. Shepherd
Attorney

F. R. WILLSON.
ANTISKID DEVICE.
APPLICATION FILED FEB. 11, 1918.
1,299,082.
Patented Apr. 1, 1919.
2 SHEETS—SHEET 2.
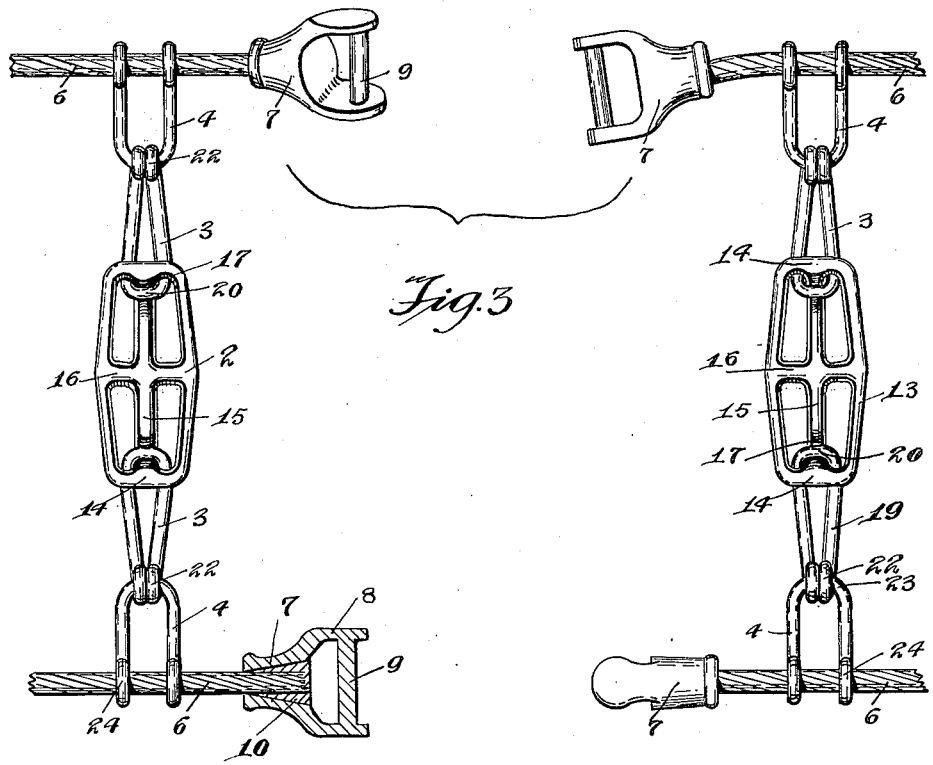
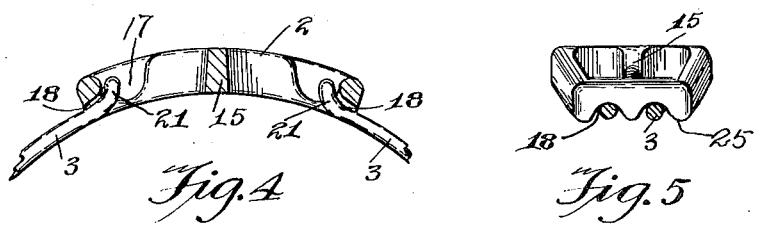

UNITED STATES PATENT OFFICE.

FREEMAN R. WILLSON, OF WORTHINGTON, OHIO.

ANTISKID DEVICE.

1,299,082.	Specification of Letters Patent.	Patented Apr. 1, 1919.

Application filed February 11, 1918. Serial No. 216,479.

*To all whom it may concern:*

Be it known that I, FREEMAN R. WILLSON, a citizen of the United States, residing at Worthington, in the county of Franklin and State of Ohio, have invented certain new and useful Improvements in Antiskid Devices, of which the following is a specification.

This invention relates to anti-skid devices designed for use in connection with automobile wheels. It is the main object of this invention to provide a structure whereby the skidding tendency is eliminated to a great extent and at the same time that a maximum tractive effort may be exerted. Further, another object of my invention resides in so forming the structure that the tire to which it is applied may be preserved and not be cut and torn as is frequently the case.

These results I accomplish in the main by the provision of a novel type of non-skid link designed to be applied and held in position upon the periphery of a vehicle wheel.

A further object of my invention resides in the structure whereby this major and central non-skid link is attached to the side links. This I accomplish preferably by providing the under side portions of the major link with spaced recesses into which the side links seat themselves to conform to the tire configuration. This major link is further provided with means, preferably an intermediate rib, which engages the side links to hold the same in their applied positions. The relative arrangement between the non-skid and side links is also such that the tread surfaces of the skid links project in such manner as to prevent undue wear upon the latter.

My invention also contemplates a novel structure for attaching my improved non-skid link to the tire.

The preferred embodiment of my invention is shown in the accompanying sheets of drawings in which similar characters of reference designate corresponding parts and in which:

Fig. 3 is an enlarged detail view of a portion of my improved structure,

Fig. 4 is an enlarged section taken through one of the non-skid links, and,

Fig. 5 is a side view of the structure shown in Fig. 4.

Figure 1:
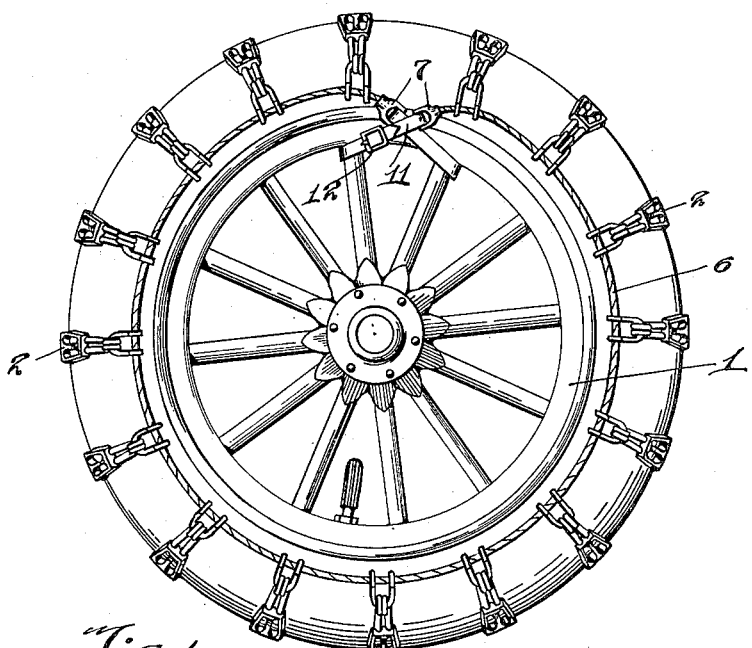
Figure 1 shows a vehicle wheel with my improved structure applied thereto.

In the drawings, I have designated the wheel in its entirety by the reference numeral 1. This wheel may be construed as being of the conventional automobile type to which my invention is designed to be applied. The non-skid structure as a whole consists of a plurality of spaced non-skid or major links 2 held in their applied positions by means of the side links 3 and 4. The former is designed to be connected directly to the non-skid links while the latter is pivotally connected at 5 at one end to the former and at the opposite end to a flexible member 6. This flexible member preferably takes the form of a cable to which the links 4 are secured in clamping relation. The ends of each of the cables 6 carry a knuckle member 7 which is preferably formed with spaced ears 8 and a connecting portion 9. These knuckle members may be secured to the cables in any desired manner as for instance by leading and calking them in position as is shown at 10. The cables are of such length to practically meet when in their applied position as shown in Fig. 1 and they are securely held in position by placing straps 11 around the portions 9 of the knuckle members 7 and also around the spokes of the wheel after the manner shown in Fig. 1. These straps are provided with buckles such as shown at 12 and the entire structure may thus be adjusted positively to its desired position.

Figure 2:
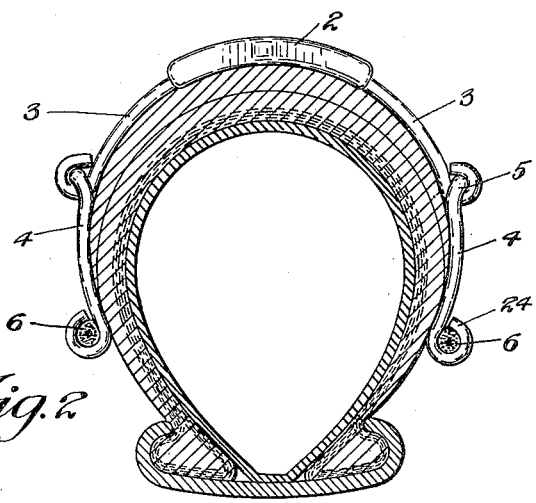
Fig. 2 is a cross section through a wheel with my invention applied.

The major or non-skid links themselves are formed to present a closed figure with side bars 13 connected by end cross bars 14. The side bars are preferably non-parallel as shown instead of straight to present a greater wearing surface to the ground and each link is also provided with intersecting bars 15 and 16, the cross bar 15 being intermediate of the side bars 13 and the intermediate bar 16 being parallel with and between the ends 14. The ends of the intermediate bar 15 are each provided with a recess 17 adjacent to the point of connection with the end bars 14 and each of these latter is provided on its under surface with a pair of recesses 18. It is into these recesses 17 and 18 that the side links 3 are designed to fit, these latter each comprising a pair of legs 19 and a connecting portion 20. The recess 17 is of such depth that the connecting portion 20 seats inwardly of the tread surface of the non-skid link to prevent undue wear. Further, the side links are given an upward bend such as is shown at 21 so that the connecting portions 20 may snugly seat themselves in the recesses 17 and that the legs 19 may seat themselves in the recess 18 to thereby conform to the shape of the tire. The ends of the links 19 are formed with eyes 22 which engage the connecting portions 23 of the side links 4. When these two sets of side links are assembled, the eyes 22 are closed to hold the parts assembled but permit of the pivotal movement. The ends of the side links 4 are in turn given a bend to present eyes as shown at 24 by means of which they are clamped to the cable 6. It will be noted by reference to Fig. 2 that the links 3 and 4 are similarly curved and that they associate to conform substantially to the contour of the tire. Further, to prevent cutting the tire these links 3 and 4 are preferably made of round wire and in addition, the under surface such as is designated at 25 of the major or non-skid link is preferably rounded to avoid the presentation of sharp edges.

From the foregoing description, taken in connection with the accompanying sheets of drawings, it will be apparent that I have provided a structure which possesses considerable utility. If desired, the entire structure may be drawn tightly into engagement with the tire to prevent any rattling noises and to prevent its creeping thereon. Further, side bars 13 and 15 add to the tractive effort of the wheel while the connecting bars 14 and 16 act essentially to prevent skidding.

What I claim is:

1. In a non-skid structure, a center non-skid link formed of a pair of outside transverse bars, end bars connecting said transverse bars, an intermediate transverse bar joining said end bars, said intermediate bar having a recess in its tread surface at each end adjacent to its connections with said end bars, said end bars having a pair of recesses in their under surfaces, and side links straddling said intermediate bars to seat themselves in said recesses.

2. In a non-skid structure, a center non-skid link arcuately shaped to fit the configuration of a tire and formed of a pair outside transverse bars, end bars connecting said transverse bars, said end bars having a pair of recesses in their under surfaces, side links formed of legs and a cross joining section, said legs being adapted to seat themselves in said recesses, and means carried by said non-skid link for engaging said side links so that their joining sections are located inwardly of the tread surface of said non-skid links.

3. In a non-skid structure, a center non-skid link arcuately shaped to fit the configuration of a tire and formed of a pair of outside transverse bars, end bars connecting said transverse bars, an intermediate transverse bar joining said end bars, a centrally located bar connecting said transverse bars, said intermediate bar having a recess in its tread surface at each end adjacent to its connections with said end bars, said end bars having a pair of recesses in their under surfaces, and side links formed of legs and a cross joining section shaped so that said legs seat themselves in said spaced recesses and said joining sections in the recesses in said intermediate bars, the latter recesses being of a depth so that the joining sections are located inwardly of the tread surface of said links.

4. In a non-skid structure, a center non-skid link arcuately shaped to fit the configuration of a tire and formed to present a closed figure with a transverse cross bar, said cross bar having a recess in its tread surface at each end where it joins said link, said link having a recess in its under surface on each side of said cross bar, and side links straddling said cross bar and adapted to seat themselves in said recesses.

5. In a non-skid structure, a center non-skid link arcuately shaped to fit the configuration of the tire and formed to present a closed figure, the under surface of opposite sides of said figure having recesses, side links formed of legs and a cross joining section, said legs being adapted to seat themselves in said recesses, means carried by said non-skid link for engaging said side links so that their joining sections are located inwardly of the tread surface of said non-skid links, and means for flexibly connecting the opposite ends of said side links together.

In testimony whereof I affix my signature in presence of two witnesses.

F. R. WILLSON.

Witnesses:
C. C. SHEPHERD,
A. SUNDELL.